(12) United States Patent
Han et al.

(10) Patent No.: US 11,430,128 B2
(45) Date of Patent: Aug. 30, 2022

(54) GEOLOGICAL LINEAR BODY EXTRACTION METHOD BASED ON TENSOR VOTING COUPLED WITH HOUGH TRANSFORMATION

(71) Applicant: CHANG'AN UNIVERSITY, Xi'an (CN)

(72) Inventors: Ling Han, Xi'an (CN); Zhiheng Liu, Xi'an (CN); Tingting Wu, Xi'an (CN); Yuming Ning, Xi'an (CN); Zhongyang Zhao, Xi'an (CN)

(73) Assignee: CHANG'AN UNIVERSITY, Xi'an (CN)

( * ) Notice: Subject to any disclaimer, the term of this patent is extended or adjusted under 35 U.S.C. 154(b) by 0 days.

(21) Appl. No.: 16/627,900

(22) PCT Filed: Sep. 17, 2018

(86) PCT No.: PCT/CN2018/105966
§ 371 (c)(1),
(2) Date: Dec. 31, 2019

(87) PCT Pub. No.: WO2019/153746
PCT Pub. Date: Aug. 15, 2019

(65) Prior Publication Data
US 2021/0287376 A1   Sep. 16, 2021
US 2022/0164960 A9   May 26, 2022

(30) Foreign Application Priority Data
Feb. 7, 2018 (CN) .......................... 201810121330.4

(51) Int. Cl.
*G06T 7/13* (2017.01)
*G06T 7/90* (2017.01)

(52) U.S. Cl.
CPC .................. *G06T 7/13* (2017.01); *G06T 7/90* (2017.01); *G06T 2207/10036* (2013.01); (Continued)

(58) Field of Classification Search
CPC ... G06T 7/13; G06T 7/90; G06T 2207/10036; G06T 2207/20024; G06T 2207/20061; G06T 2207/20192
See application file for complete search history.

(56) References Cited

U.S. PATENT DOCUMENTS

| | | | |
|---|---|---|---|
| 2002/0114533 A1* | 8/2002 | Smith | H04N 5/217 382/167 |
| 2013/0066666 A1* | 3/2013 | Anderson, Jr. | G06Q 10/06 705/7.12 |

(Continued)

FOREIGN PATENT DOCUMENTS

| | | | | |
|---|---|---|---|---|
| CN | 106294705 A | * | 1/2017 | G06F 16/51 |
| CN | 107301661 A | | 10/2017 | |

(Continued)

OTHER PUBLICATIONS

Sang ("Image sharpening by Gaussian and Butterworth high pass filter," Biomedical & Pharmacology Journal, vol. 7(2), 2014) (Year: 2014).*

(Continued)

*Primary Examiner* — Yubin Hung
(74) *Attorney, Agent, or Firm* — Armstrong Teasdale LLP (57) ABSTRACT

The present disclosure provides geological linear body extraction method based on tensor voting coupled with Hough transformation, including pre-processing a remote sensing image to obtain a pre-processed remote sensing image; selecting three optimal wavebands from N multi-spectral wavebands of the pre-processed remote sensing image, so as to obtain a remote sensing image combined by
(Continued)

the optimal wavebands, N being a natural number greater than or equal to 3; using Gaussian high-pass filtering to perform sharpening processing on the remote sensing image combined by the optimal wavebands, so as to enhance linearized edge information; performing edge detection on the remote sensing image having enhanced linearized edge information, so as to obtain all edge points in the remote sensing image; and converting all the edge points in the remote sensing image from an image coordinate system to a parameter coordinate system, and extracting a geological linear body from the parameter coordinate system.

4 Claims, 5 Drawing Sheets

(52) U.S. Cl.
CPC ............... *G06T 2207/20024* (2013.01); *G06T 2207/20061* (2013.01); *G06T 2207/20192* (2013.01)

(56) References Cited

U.S. PATENT DOCUMENTS

| | | | | |
|---|---|---|---|---|
| 2013/0336540 | A1* | 12/2013 | Zhang | G06T 7/45 382/108 |
| 2016/0078057 | A1* | 3/2016 | Perez de la Coba | G06F 16/5838 707/772 |
| 2017/0032170 | A1* | 2/2017 | Bazrafkan | G06V 40/1335 |
| 2017/0098310 | A1* | 4/2017 | Chefd'hotel | G06T 7/0012 |
| 2017/0169607 | A1* | 6/2017 | Miller | G06T 7/579 |
| 2018/0035605 | A1* | 2/2018 | Guan | G06K 9/6249 |
| 2018/0232900 | A1* | 8/2018 | Kraft | G06T 7/62 |

FOREIGN PATENT DOCUMENTS

| | | | | |
|---|---|---|---|---|
| CN | 107563964 | A | * | 1/2018 |
| CN | 108492260 | A | | 9/2018 |
| KR | 101580594 | B1 | | 12/2015 |
| WO | WO-2014183259 | A1 | * | 11/2014 ............... G06T 5/50 |

OTHER PUBLICATIONS

Grodecki et al. ("Block Adjustment of High-Resolution Satellite Images Described by Rational Polynomials," Photogrammetric Engineering & Remote Sensing vol. 69, No. 1, Jan. 2003) (Year: 2003).*
Hansen et al. ("Linear feature analysis for aeromagnetic data," Geophysics, vol. 71, No. 6, 2006) (Year: 2006).*
Wu et al. ("Feature extraction for hyperspectral data based on MNF and singular value decomposition," IEEE International Geoscience and Remote Sensing Symposium—IGARSS; Date of Conference: Jul. 21-26, 2013) (Year: 2013).*
Wang, et al. ("Rotational Invariance Based on Fourier Analysis in Polar and Spherical Coordinates," IEEE Transactions on Pattern Analysis and Machine Intelligence, vol. 31, No. 9, Sep. 2009) (Year: 2009).*
Wang-J et al. ("Improved curvature gravity gradient tensor with principal component analysis and its application in edge detection of gravity data," Journal of Applied Geophysics 118 (2015)) (Year: 2015).*
Boring ("Visualization of tensor fields," Master Thesis, University of California, Santa Cruz, 1998) (Year: 1998).*
Medioni et al. ("Tensor Voting: Theory and Applications," Proceedings of RFIA, 2000) (Year: 2000).*
Moreno et al. ("Robust color edge detection through tensor voting," 16th IEEE International Conference on Image Processing; Date of Conference: Nov. 7-10, 2009) (Year: 2009).*
Milnet et al. ("Adaptive band selection snapshot multispectral imaging in the VIS-NIR domain," arXiv:1009.5823; Sep. 29, 2010) (Year: 2010).*
PCT International Search Report, Application No. PCT/CN2018/105966, dated Dec. 27, 2018, 5 pages.: with English translation.
PCT Written Opinion, Application No. PCT/CN2018/105966, dated Dec. 27, 2018, 9 pages.: with English translation.
Jingchang Gao et al., "Use of Microcomputer in Automated Lineament Detection from Remotely-Sensed Imagery", Journal of Remote Sensing, vol. 9, No. 1, Feb. 28, 1994, pp. 62-67.: with English translation of the Abstract.
Zhiheng Liu et al., "A Method for Cloud Interpretation in ZY-3 Satellite Imagery and Its Application", Remote Sensing Information, vol. 32, No. 4, Aug. 31, 2017, pp. 41-46.: with English translation of the Abstract.

* cited by examiner

GEOLOGICAL LINEAR BODY EXTRACTION METHOD BASED ON TENSOR VOTING COUPLED WITH HOUGH TRANSFORMATION

CROSS REFERENCE TO RELATED APPLICATIONS

This patent application is a National Stage Entry of PCT/CN2018/105966 filed on Sep. 17, 2018, which claims the benefit and priority of Chinese Patent Application No. 201810121330.4 filed on Feb. 7, 2018, the disclosures of which are incorporated by reference herein in their entirety as part of the present application.

BACKGROUND

The present disclosure relates to the field of remote sensing geology and image processing technologies, and more particularly, to a geological linear body extraction method based on tensor voting coupled with Hough transformation.

Geological structures such as fault regions and faults belong to geologically weak regions, and they may form linear landforms due to erosion effects and the like. Under the action of the geological structures, these linear landforms generally present obvious linear distribution on remote sensing images, which are referred to as geological linear bodies. These geological linear bodies control the migration of underground fluids (ore solutions, groundwater, and oil and gas, etc.) and spatial occurrence of mineral resources. Orientations and densities of the underground fluids and mineral resources have far-reaching scientific significance and practical value for analyzing regional tectonic movement trends and activity levels.

Since the 1980s, many domestic and overseas remote sensing geologists have used expert knowledge and experience and image processing methods to extract geological linear bodies of remote sensing images and digital elevation models (DEM), and analyze regional geological structure trends and effect degree. For example, Jansson et al. (2005) used Landsat 7 ETM+ and digital elevation models to extract geological linear bodies and mapped glacial landforms in the northeast of Wales. Wu Jing et al. (2011) extracted fault structure information using Canny edge detection and Hough transformation, and used ENVI+IDL and other programming languages. Yuan Xiaoxiang et al. (2011) highlighted the contrast of geological linear bodies on multi-source remote sensing data using false color synthesis, principal component transform, tasseled cap transformation, waveband ratio, landform rendering and the like, and extracted active faults. Alaa, A M et al. (2011) extracted geological linear bodies on images processed by mountain shadow rendering using a clue tracing algorithm based on DEM data and linear features of mountain shadow enhancement, used a B-spline curve to provide an integrated expression, and finally evaluated regional geological structural environment conditions. Yusof et al. (2011) analyzed the relationship between landslide hazard distribution around highways and geological linear body density. Liu Zhirong et al. (2012) extracted and analyzed information and distribution of active faults in Yinchuan using image enhancement processing algorithms such as contrast enhancement, color synthesis, directional filtering and image fusion. Bahiru et al. (2016) extracted and mapped the geological linear structure distribution in Uganda using Landsat ETM+ and SRTMDEM data, studied the distribution of gold mines in this region, which had an important research significance for mineral prediction.

Some achievements have been achieved in different degrees in the above researches. However, there mainly are the following deficiencies.

1) The correctness of visual interpretation results relies on experience and knowledge backgrounds of interpretation experts, which is time-consuming, labor-consuming, and inefficient.

2) The accuracy of computer interpretation is related to the processing speed and the resolution of the data source. The larger an image is, the slower the processing speed is. If the resolution is too high, the image is easily affected by linear features such as roads and land use boundaries, which may produce a large number of wrong linear edges, and thus producing too much noise. Relying too much on parameter settings may lead to poor general universality.

BRIEF DESCRIPTION

In view of deficiencies of existing technologies, embodiments of the present disclosure provide a geological linear body extraction method based on tensor voting coupled with Hough transformation, so as to solve the problem that the existing technologies rely on experience and knowledge of interpretation experts, and are time and labor consuming, low in efficiency, slow in processing speed, high in noise, and poor in universality.

To solve the above technical problems, the present disclosure is implemented by using the following technical solutions.

A geological linear body extraction method based on tensor voting coupled with Hough transformation includes following steps:

Step 1, pre-processing a remote sensing image to obtain a pre-processed remote sensing image;

Step 2, selecting three optimal wavebands from N multispectral wavebands of the pre-processed remote sensing image to obtain a remote sensing image combined by the optimal wavebands, N being a natural number greater than or equal to 3;

Step 3, performing sharpening processing on the remote sensing image combined by the optimal wavebands by using Gaussian high-pass filtering to enhance linearized edge information;

Step 4, performing edge detection on the remote sensing image having enhanced linearized edge information in Step 3 to obtain all edge points in the remote sensing image; and Step 5, converting all the edge points in the remote sensing image from an image coordinate system to a parameter coordinate system to extract a geological linear body from the parameter coordinate system.

The image coordinate system uses any corner of the remote sensing image as an origin, a horizontal direction of the remote sensing image as an x-axis, and a vertical direction of the remote sensing image as a y-axis.

The parameter coordinate system is expressed as $\rho = x \cos\theta + y \sin\theta$, where $\theta$ and $\rho$ represent polar coordinates of the edge points in the parameter coordinate system respectively.

Further, pre-processing a remote sensing image in step 1 includes selecting any remote sensing image from a remote sensing image database as a current remote sensing image, the current remote sensing image containing a cloud amount of less than 5%, and having rational polynomial coefficients (RPC) and statistical image grayscale information, the image grayscale information including a gray variance and a standard deviation for each waveband, and performing radiometric calibration, atmospheric correction, and image cropping on the current remote sensing image.

Further, selecting three optimal wavebands from N multi-spectral wavebands of the pre-processed remote sensing image in step 2 includes:

selecting three wavebands corresponding to a maximum optimum index factor (OIF) from the multi-spectral wavebands of the pre-processed remote sensing image as the optimal wavebands;

wherein the OIF is obtained based on Formula (1) as below:

$$OIF = \frac{\sum_{i=1}^{3} S_i}{\sum_{j=1}^{3} |R_{ij}|} \quad (1)$$

where in Formula (1), $S_i$ represents a standard deviation of an ith waveband, $R_{ij}$ represents a correlation coefficient between the ith waveband and a jth waveband, $i \neq j$, $i=1, 2, 3$, $j=1, 2, 3$; and $$R_{ij} = \frac{Cov(i, j)}{\sqrt{D(i)} \sqrt{D(j)}},$$

where $D(i)$ and $D(j)$ respectively represent a variance of the ith waveband and a variance of the jth waveband, and $Cov(i,j)$ represents a covariance between the ith waveband and the jth waveband.

Further, performing sharpening processing on the remote sensing image combined by the optimal wavebands by using Gaussian high-pass filtering in step 3 includes:

performing Gaussian high-pass filtering on the remote sensing image combined by the optimal wavebands to obtain a filtered remote sensing image H(u,v) based on Formula (2) as below:

$$H(u, v) = 1 - e^{-\frac{D^2(u,v)}{2D_0^2}} \quad (2)$$

where, in Formula (2), D(u,v) represents a distance between a frequency domain midpoint (u,v) of the remote sensing image combined by the optimal wavebands and a frequency rectangle center, and $D_0$ represents a constant.

Further, performing edge detection on the remote sensing image having enhanced linearized edge information in Step 3 to obtain all edge points in the remote sensing image in step 4 includes:

Step 41: arbitrarily selecting a pixel from the remote sensing image having enhanced linearized edge information as a current pixel point, and performing Laplacian convolution on the current pixel to obtain a tensor matrix T;

where $$T = \begin{bmatrix} \frac{\partial^2 I}{\partial x^2} & \frac{\partial^2 I}{\partial x \partial y} \\ \frac{\partial^2 I}{\partial y \partial x} & \frac{\partial^2 I}{\partial y^2} \end{bmatrix},$$

I represents the remote sensing image having enhanced linearized edge information, and $$\frac{\partial^2 I}{\partial x^2}$$

and $$\frac{\partial^2 I}{\partial y^2}$$

respectively represent a second derivative of the remote sensing image I along a direction x and a second derivative of the remote sensing image I along a direction y, and $$\frac{\partial^2 I}{\partial x \partial y}$$

and $$\frac{\partial^2 I}{\partial y \partial x}$$

respectively are second derivatives of the remote sensing image I along the x and y directions and along the y and x directions, wherein x and y respectively represent an x-axis and ay-axis of an image coordinate system established by taking any corner of the remote sensing image I as an origin, a horizontal direction of the remote sensing image I as the x-axis, and a vertical direction of the remote sensing image I as the y-axis.

Step 42: performing matrices spectrum decomposition on the tensor matrix T to obtain a rod-shaped component and a spherical component;

where $$T = (\lambda_1 - \lambda_2)\vec{e}_1\vec{e}_1^T + \lambda_2(\vec{e}_1\vec{e}_1^T + \vec{e}_2\vec{e}_2^T), \quad \vec{e}_1\vec{e}_1^T$$

represents the rod-shaped component, and $$(\vec{e}_1\vec{e}_1^T + \vec{e}_2\vec{e}_2^T)$$

represents the spherical component;

Step 43: determining the current pixel as an edge point, if $(\lambda_1-\lambda_2)>\lambda_2$, otherwise, determining the current pixel as a non-edge point; and Step 44: repeating the Step 41 to Step 43 until all pixels of the remote sensing image having enhanced linearized edge information are determined as current pixels to obtain all the edge points in the remote sensing image.

Further, converting all the edge points in the remote sensing image from an image coordinate system to a parameter coordinate system to extract a geological linear body from the parameter coordinate system in step 5 includes:

Step 51, traversing the parameter coordinate system to search for a point with a local maximum value, determining the point with the local maximum value as a peak point, and setting coordinates of the peak point as (ρ, θ), where (ρ, θ) respectively represent a slope and an intercept of the geological linear body in the remote sensing image; and Step 52: converting the coordinates corresponding to the peak point in the parameter coordinate system into the image coordinate system, and connecting the edge points according to the direction of the edge points and distance of the endpoint to obtain an image of the geological linear body, thereby completing the extraction of the geological linear body. Compared with the existing technologies, the present disclosure has the following technical effects.

1. Combining algorithms and rules such as waveband selection, image enhancement, boundary detection, and linear extraction, the present disclosure provides a geological linear body extraction method based on tensor voting coupled with Hough transformation. Compared with simple visual interpretation methods, this method relies less on knowledge and experience of interpretation experts, thereby considerably shortening the time of processing, saving a vast amount of manpower, and thus having a greater practical value and a promotion significance.

2. Compared with the Canny edge detection algorithm, the edge detection algorithm based on tensor voting can provide a boundary detection on the basis of an edge detection, and also can provide tensor voting on a grayscale image directly using a two-dimensional circular voting domain, then provide a voting interpretation and provide a boundary extraction based on the saliency of boundary characteristics. This edge detection algorithm based on tensor voting has robustness.

3. The present disclosure can process multi-source remote sensing data, provide more balanced parameter setting, have better universality, and have a greater indicative effect on regional tectonic evolution and plate movement direction.

Specific contents of the present disclosure are further described below in detail with reference to the accompanying drawings.

DETAILED DESCRIPTION

The remote sensing image in the present disclosure is a Landsat 8 OLI winter multispectral remote sensing image.

Specific embodiments of the present disclosure are provided hereinafter. It is to be noted that the present disclosure is not limited to the following specific embodiments, and all equivalent modifications made based on the technical solutions of the present disclosure shall fall within the scope for protection of the present disclosure.

Figure 1:
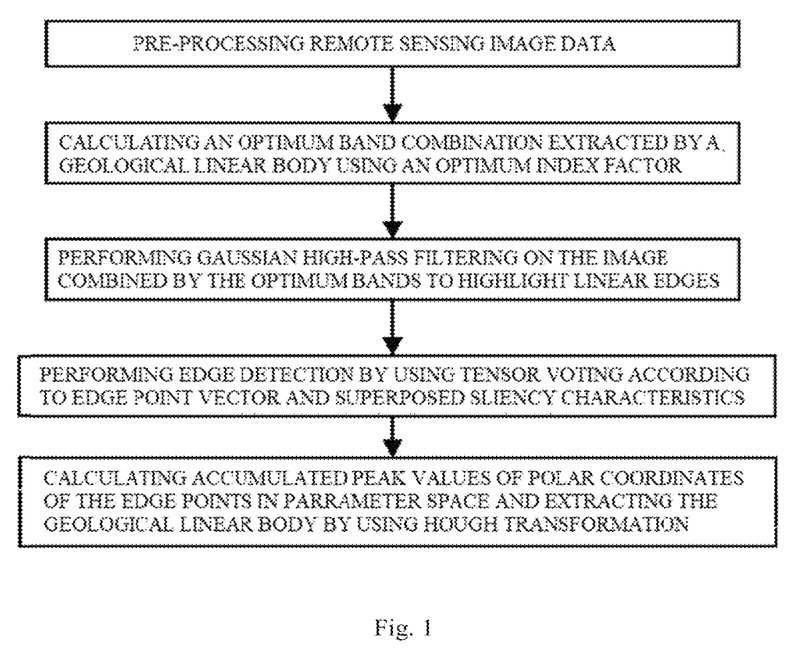
FIG. 1 is an overall flowchart of a geological linear body extraction method based on tensor voting coupled with Hough transformation according to the present disclosure.

As shown in FIG. 1, this embodiment provides a geological linear body extraction method based on tensor voting coupled with Hough transformation, which includes following steps.

In Step 1, a remote sensing image is pre-processed to obtain a pre-processed remote sensing image.

Specifically, in this embodiment, any remote sensing image is selected from a remote sensing image database as a current remote sensing image. The current remote sensing image contains a cloud amount of less than 5%, and has rational polynomial coefficients (RPC) and statistical image grayscale information, wherein the image grayscale information includes a gray variance and a standard deviation for each waveband.

Furthermore, radiometric calibration, atmospheric correction, and image cropping are performed on the current remote sensing image.

The remote sensing image in this embodiment is a Landsat 8 OLI winter multispectral remote sensing image since a vegetation coverage is less in winter, and a linear edge is prominent in the image. The cloud amount in the image should be less than 5%, and the image has rational polynomial coefficients (RPC) and statistical image grayscale information, so as to be compared with geological data, and verify the accuracy of preprocessing.

The statistical image grayscale information mainly includes a grayscale variance $D_i$ and a standard deviation $S_i$ for each waveband, and the statistical information is as shown in the following table for subsequent analysis.

TABLE 1

| Waveband | Landsat 8 OLI multispectral remote sensing image | | | | |
| --- | --- | --- | --- | --- | --- |
| | Minimum value | Maximum value | Mean value | Standard deviation | Variance |
| Waveband 2 | 7969 | 18420 | 8996.892 | 430.374 | 185221.780 |
| Waveband 3 | 6865 | 20017 | 8329.576 | 617.682 | 381531.053 |
| Waveband 4 | 6383 | 21132 | 8411.123 | 869.402 | 755859.838 |
| Waveband 5 | 6001 | 24660 | 11162.029 | 2467.527 | 6088689.496 |
| Waveband 6 | 5462 | 41540 | 11723.583 | 1649.024 | 2719280.153 |
| Waveband 7 | 5432 | 52154 | 10169.226 | 1527.724 | 2333940.620 |

In Step 2, three optimal wavebands are selected from N multi-spectral wavebands of the pre-processed remote sensing image to obtain a remote sensing image combined by the optimal wavebands, wherein N is a natural number greater than or equal to 3.

Specifically, in this embodiment, three wavebands corresponding to a maximum optimum index factor (OIF) are selected from the multi-spectral wavebands of the pre-processed remote sensing image as the optimal wavebands.

The OIF is obtained based on Formula (1) as below:

$$OIF = S(i,j,k)/R(m,n) \quad (1)$$

where in Formula (1), $S(i,j,k) = S_i + S_j + S_k$, $R(m.n) = R_{mn}$, $i, j, k \in \{1, \ldots, N\}$ and $i<j<k$, $m, n \in \{i, j, k\}$ and $m<n$, $S_i$, $S_j$, and $S_k$ each represent a standard deviation of an ith, jth, and kth waveband, respectively, $R_{mn}$ represents a correlation coefficient between the mth waveband and the nth waveband; and $$R_{mn} = \frac{Cov(m, n)}{\sqrt{D(m)} \sqrt{D(n)}},$$

wherein D(m) and D(n) respectively represent a variance of the mth waveband and a variance of the nth waveband, and wherein Cov(m,n) represents a covariance between the mth waveband and the nth waveband.

In this embodiment, a waveband correlation coefficient matrix is calculated using six multi-spectral wavebands of the Landsat 8 OLI remote sensing image, as shown in Table 2.

TABLE 2

Correlation Coefficient Matrix of Landsat 8 OLI Wavebands in Study Region

| Correlation coefficient | Waveband 2 | Waveband 3 | Waveband 4 | Waveband 5 | Waveband 6 | Waveband 7 |
|---|---|---|---|---|---|---|
| Waveband 2 | 1 | 0.971 | 0.916 | 0.555 | 0.679 | 0.702 |
| Waveband 3 | 0.971 | 1 | 0.954 | 0.629 | 0.727 | 0.734 |
| Waveband 4 | 0.916 | 0.954 | 1 | 0.447 | 0.821 | 0.867 |
| Waveband 5 | 0.555 | 0.629 | 0.447 | 1 | 0.417 | 0.235 |
| Waveband 6 | 0.679 | 0.727 | 0.821 | 0.417 | 1 | 0.955 |
| Waveband 7 | 0.702 | 0.734 | 0.867 | 0.235 | 0.955 | 1 |

The greater the correlation coefficient is, the more redundant information between the wavebands is. An analysis of the correlation coefficient between the wavebands of the image is disadvantageous to highlighting information of different geological bodies. In Table 2, the correlation coefficient between Waveband5 and other wavebands is generally small, so first priority may be given to Waveband5 for image synthesis. As a short-wave infrared waveband, Waveband7 is sensitive to rocks and specific minerals for differentiating between major rock types, and detect hydrothermal rock alteration, and related clay minerals. Second priority may be given to Waveband7 for image synthesis.

Figure 2:
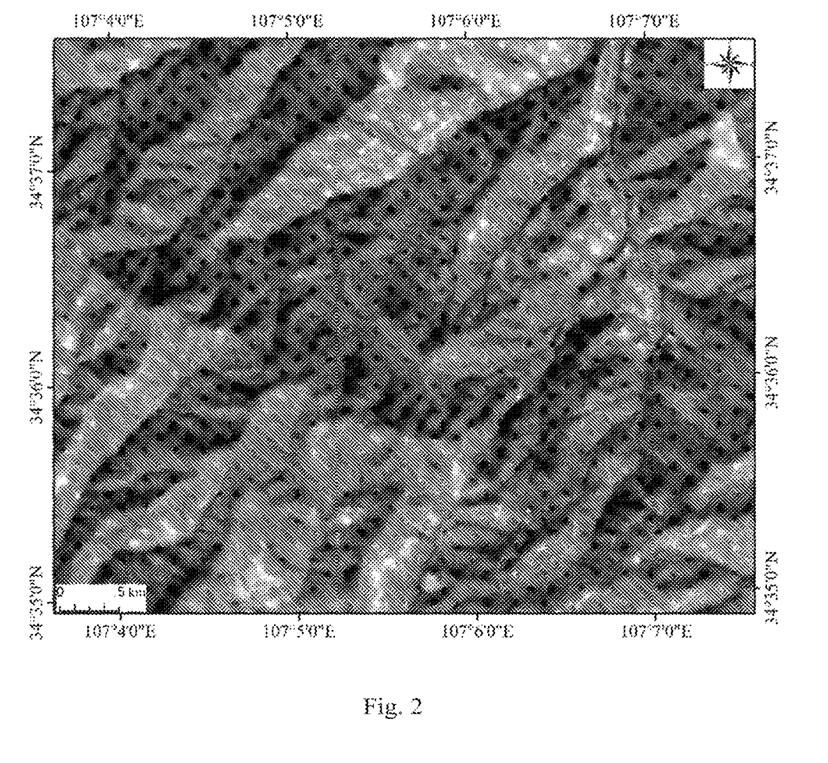
FIG. 2 is a remote sensing image of waveband combination 7-5-4 in a research region according to an embodiment of the present disclosure.

The waveband combination of the remote sensing image is as shown in Table 3. As can be seen from Table 3, the combination of 7-5-4 and the combination 7-5-6 respectively have the largest OIF and the second largest OIF. However, the correlation coefficient between Waveband5 and Waveband4 is 0.447, and the correlation coefficient between Waveband5 and Waveband6 is 0.417. Therefore, the waveband combination 7-5-4 should be selected. It is finally determined that Waveband7, Waveband5, and Waveband4 respectively correspond to a red image, a green image, and a blue image obtained by synthesis, as shown in FIG. 2, to enhance the contrast between various ground objects. That is, FIG. 2 shows the remote sensing image combined by the optimal wavebands.

TABLE 3

Landsat 8 OLI Waveband Combination and Corresponding OIF

| No. | Waveband combination | OIF |
|---|---|---|
| 1 | 754 | 3645.006 |
| 2 | 756 | 3514.872 |
| 3 | 752 | 2967.049 |
| 4 | 546 | 2959.37 |
| 5 | 753 | 2886.44 |
| 6 | 625 | 2755.296 |
| 7 | 635 | 2669.887 |
| 8 | 542 | 1964.237 |
| 9 | 543 | 1947.813 |
| 10 | 235 | 1631.404 |
| 11 | 637 | 1570.491 |
| 12 | 627 | 1544.165 |
| 13 | 746 | 1531.262 |
| 14 | 634 | 1253.385 |
| 15 | 624 | 1220.422 |
| 16 | 743 | 1180.008 |
| 17 | 742 | 1137.641 |
| 18 | 623 | 1134.523 |
| 19 | 237 | 1069.798 |
| 20 | 234 | 674.891 |

In addition, the removal of extra wavebands is intended to resist the interference to the synthesized image by the other wavebands. If all wavebands are used, data redundancy will be resulted in once the correlation coefficient between any two wavebands is too high.

In Step 3, sharpening processing is performed on the remote sensing image combined by the optimal wavebands using Gaussian high-pass filtering to enhance linearized edge information.

Specifically, Gaussian high-pass filtering is performed on the remote sensing image combined by the optimal wavebands to obtain a filtered remote A sensing based on Formula (2) as below:

$$H(u, v) = 1 - e^{-\frac{D^2(u,v)}{2D_0^2}} \quad (2)$$

where H(u,v) is the coefficient of the Gaussian high-pass filter at location (u,v) of a frequency rectangular that is the support of the Gaussian high-pass filter, D(u,v) represents a distance between a midpoint (u,v) of a frequency domain of the remote sensing image combined by the optimal wavebands and the center of the frequency rectangle, and Do is a constant.

In this embodiment, a sharpening effect on a linear edge of the remote sensing image by Gaussian high-pass filtering is employed to process the remote sensing image combined by the optimal wavebands obtained in the Step 2, so as to highlight the linear edge, and obtain the remote sensing image having enhanced linearized edge information, which is extracted by the geological linear body.

The advantage lies in that as a typical image sharpening enhancement operator, the Gaussian high-pass filtering can allow high-frequency components to pass smoothly but suppress low-frequency components, that is, to enhance edge features but suppress non-edge noise. As a specific high-pass filtering, Gaussian high-pass filtering enhances the contrast of images and makes them more distinguishable.

Figure 3:
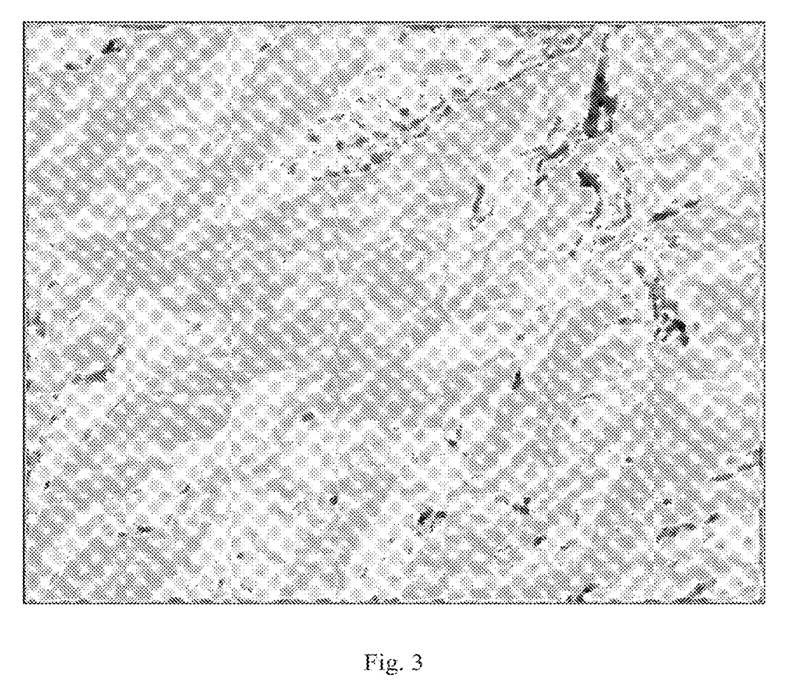
FIG. 3 is an enhanced image processed by Gaussian high-pass filtering in research region according to an embodiment of the present disclosure.

FIG. 3 shows a remote sensing image processed by Gaussian high-pass filtering. Geological and geomorphic lines such as valley lines and ridge lines are highlighted in the image, presenting distinct linear landforms.

In Step 4, edge detection is performed on the remote sensing image having enhanced linearized edge information in Step 3 to obtain all edge points in the remote sensing image.

Further, a boundary point vector and superposed saliency characteristics of the Step 4 are defined as follows:

$$DF(L, k) = e^{-\frac{(L^2 + ck^2)}{\sigma^2}}$$

$$c = \frac{-16(\sigma - 1)\log(0.1)}{\pi^2}$$

wherein DF(L, k) represents a saliency function, L represents a length of a curve, k represents a curvature, σ represents a voting neighborhood range, and c represents a coefficient for controlling curvature attenuation.

Specifically, in Step 41, a pixel is arbitrarily selected, from the remote sensing image having enhanced linearized edge information, as a current pixel point, and Laplacian convolution is performed on the current pixel to obtain a tensor matrix T;

wherein, $$T = \begin{bmatrix} \frac{\partial^2 I}{\partial x^2} & \frac{\partial^2 I}{\partial x \partial y} \\ \frac{\partial^2 I}{\partial y \partial x} & \frac{\partial^2 I}{\partial y^2} \end{bmatrix}, I$$

I represents the remote sensing image having enhanced linearized edge information, and $$\frac{\partial^2 I}{\partial x^2}$$

and $$\frac{\partial^2 I}{\partial y^2}$$

respectively represent a second derivative of the remote sensing image I along an x direction and a second derivative of the remote sensing image I along ay direction, and $$\frac{\partial^2 I}{\partial x \partial y}$$

and $$\frac{\partial^2 I}{\partial y \partial x}$$

respectively are second derivatives of the remote sensing image I along the x and y directions and along the y and x directions, wherein x and y respectively represent an x-axis and ay-axis of an image coordinate system established by taking any corner of the remote sensing image I as an origin, a horizontal direction of the remote sensing image I as the x-axis, and a vertical direction of the remote sensing image I as the y-axis.

In this embodiment, the second derivative in the tensor matrix T is calculated using a Laplace operator as follows:

$$L = \begin{bmatrix} 0 & 1 & 0 \\ 1 & -4 & 1 \\ 0 & 1 & 0 \end{bmatrix}$$

By performing singular value decomposition, the following formula may be obtained:

$$T = \begin{bmatrix} \vec{e_1} & \vec{e_2} \end{bmatrix} \begin{bmatrix} \lambda_1 & 0 \\ 0 & \lambda_2 \end{bmatrix} \begin{bmatrix} \vec{e_1}^T \\ \vec{e_2}^T \end{bmatrix} = \lambda_1 \vec{e_1}\vec{e_1}^T + \lambda_2 \vec{e_2}\vec{e_2}^T$$

In Step 42, matrices spectrum decomposition is performed on the tensor matrix T to obtain a rod-shaped component and a spherical component.

Wherein, $$T = (\lambda_1 - \lambda_2)\vec{e_1}\vec{e_1}^T + \lambda_2(\vec{e_1}\vec{e_1}^T + \vec{e_2}\vec{e_2}^T), \vec{e_1}\vec{e_1}^T$$

represents the rod-shaped component, and $$(\vec{e_1}\vec{e_1}^T + \vec{e_2}\vec{e_2}^T)$$

represents the spherical component.

In Step 43, the current pixel is determined as an edge point if $(\lambda_1 - \lambda_2) > \lambda_2$, otherwise, the current pixel is determined as a non-edge point.

Specifically, if $\lambda_1 \approx \lambda_2$, the current pixel is located at an internal point or intersection of an region; if both $\lambda_1$ and $\lambda_2$ take a very small value, the current pixel is determined as a non-edge point.

In Step 44, the Step 41 to the Step 43 are repeated until all pixels of the remote sensing image having enhanced linearized edge information are determined as current pixels to obtain all the edge points in the remote sensing image.

Figure 4:
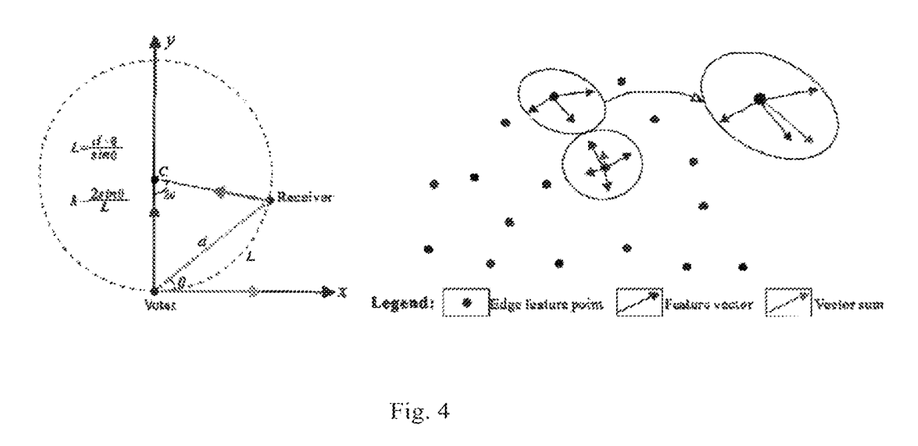
FIG. 4 is a schematic diagram of tensor voting according to the present disclosure.

FIG. 4 is a schematic diagram of tensor voting. Due to the gray-scale mutation of the linear edge points, after being voted through 8 neighborhood points, the vectors of the linear edge points have significant changes, specifically embodied in that their saliency functions are greater than 0. Therefore, the linear edge points are determined as edge points and are saved. Because neighborhood points of the nonlinear edge points are of the same substance, after being voted through neighborhood points, the vector sum of the nonlinear edge points has no significant change, specifically embodied in that their saliency functions are approximately equal to 0. Therefore, the nonlinear edge points are determined as non-edge points and are deleted.

Figure 5:
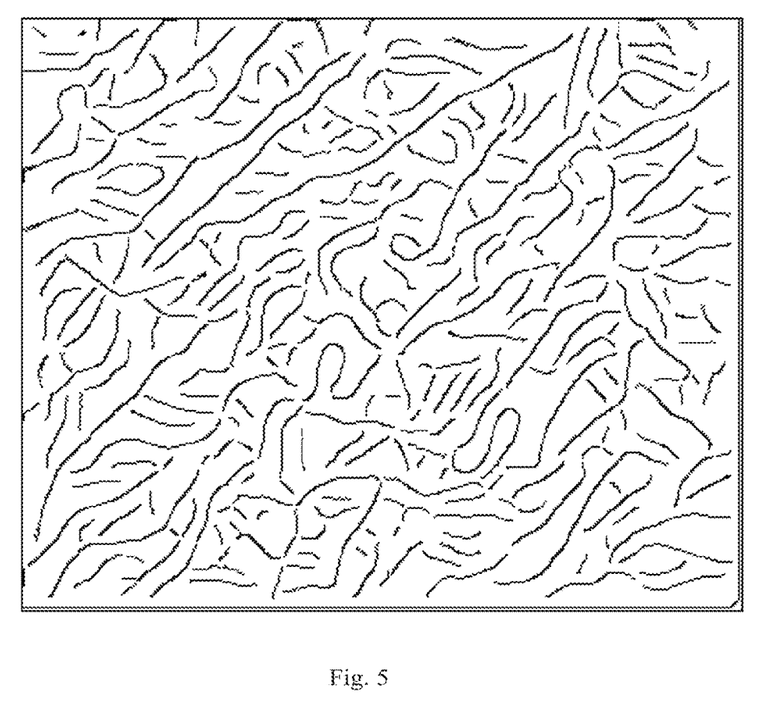
FIG. 5 is an image obtained by an edge detection after tensor voting in a research region according to an embodiment of the present disclosure.

In Step 4 of this embodiment, features to be extracted which are represented by tensor are subjected to sparse and multi-scale intensive voting, the vector sum is superimposed, and the non-geological linear body boundary points are voted in different directions, and the vector interaction is counteracted, the boundary points are enhanced because they are only voted from a certain side, and finally, the boundary of this region is obtained by voting interpretation. Saliency characteristics of the vector sum processed by boundary point superposition are calculated using a saliency function, and the edge detection of the tensor voting method is realized to obtain binary black and white images, as shown in FIG. 5.

In Step 5, all the edge points in the remote sensing image are converted from an image coordinate system to a parameter coordinate system to extract a geological linear body from the parameter coordinate system.

In this embodiment, the edge points are converted from the image coordinate system to the parameter coordinate system by using Hough transformation, and then peak values of the parameter coordinate system are calculated, and locations corresponding to the peak values are recorded, such that the geological linear body is extracted.

The image coordinate system uses any corner of the remote sensing image as an origin, a horizontal direction of the remote sensing image as an x-axis, and a vertical direction of the remote sensing image as a y-axis.

The parameter coordinate system is expressed as $\rho = x \cos\theta + y \sin\theta$, wherein I and I represent polar coordinates of the edge points in the parameter coordinate system.

Specifically, in Step 51, the parameter coordinate system is traversed to search for a point of a local maximum value, the point of the local maximum value is determined as a peak point, and coordinates of the peak point are set as $(\rho, \theta)$, wherein $(\rho, \theta)$ respectively represent a slope and an intercept of the geological linear body in the remote sensing image.

In this embodiment, the edge points are converted from the image coordinate system to the parameter coordinate system by using the Hough transformation, and the original edge point coordinates are converted to the parameter coordinate system based on $(\rho, \theta)$, and are continuously accumulated. The $\rho$-$\theta$ space is traversed to find the point with the local maximum value (extreme value), which is referred to as the peak point.

Figure 6:
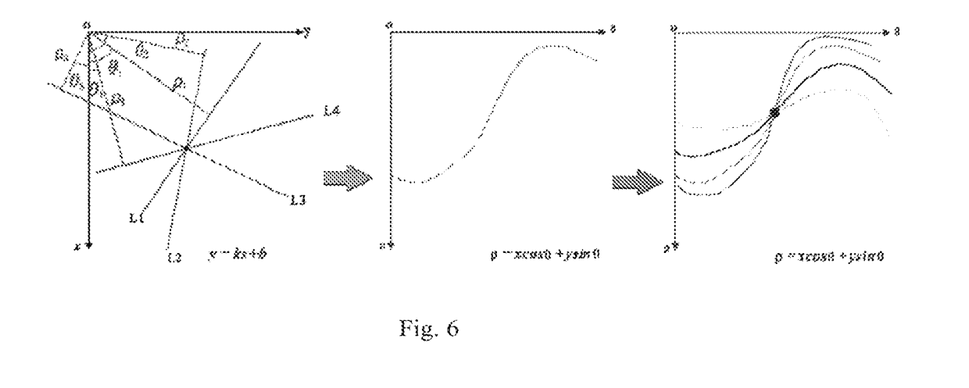
FIG. 6 is a schematic diagram of Hough transformation according to the present disclosure.

FIG. 6 respectively illustrates, from left to right, schematic diagrams where pixel points in the image coordinate system are converted to the parameter coordinate system by using the Hough transformation, wherein a peak point in the rightmost in schematic diagram of FIG. 6 is obtained based on continuous accumulation.

Figure 7:
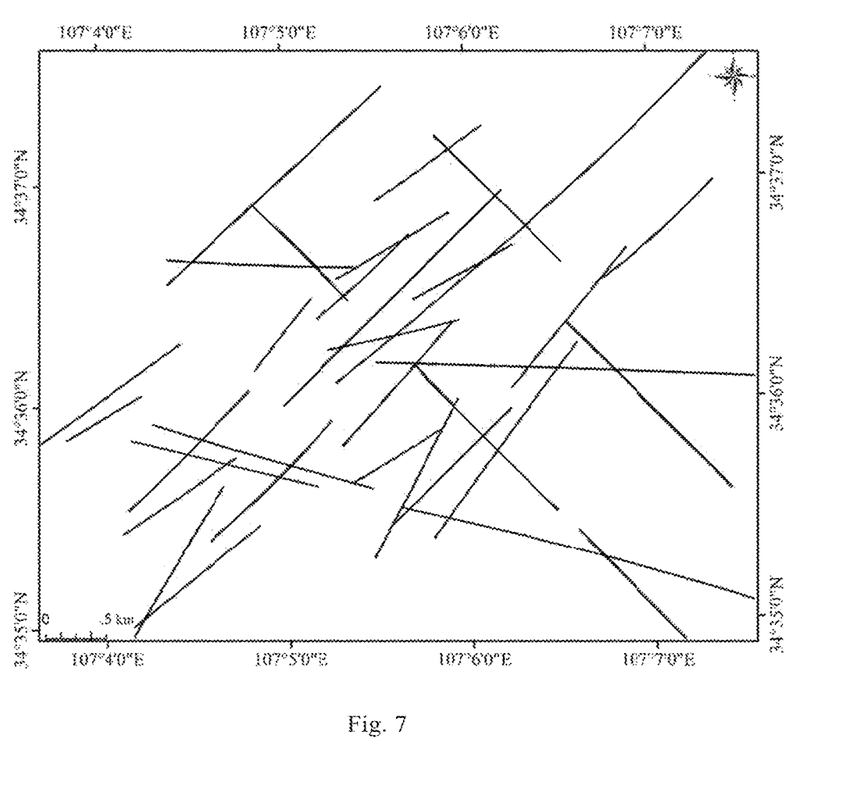
FIG. 7 is an extracted image of a geological linear body according to the present disclosure.

In Step 52, the coordinates corresponding to the peak point in the parameter coordinate system are converted into the image coordinate system, and the edge points are connected into lines according to the direction of the edge points and the distance of the endpoint to obtain an image of the geological linear body, thereby completing the extraction of the geological linear body. FIG. 7 is a distribution diagram of geological linear bodies obtained by superimposed Hough transformation in this region.

What is claimed is:

1. A method for extracting a geological linear body from a remote sensing image based on tensor voting coupled with Hough transformation, the method comprising:
   pre-processing the remote sensing image to obtain a pre-processed remote sensing image;
   selecting three optimal wavebands from N multi-spectral wavebands of the pre-processed remote sensing image and combine the selected optimal wavebands to obtain a combined remote sensing image, N is a natural number greater than or equal to 3;
   performing sharpening processing on the combined remote sensing image by using Gaussian high-pass filtering to enhance linearized edge information to obtain a filtered remote sensing image;
   performing edge detection on the filtered remote sensing image to obtain edge points in the filtered remote sensing image; and
   converting all the obtained edge points in the filtered remote sensing image from an image coordinate system to a parameter coordinate system to extract the geological linear body from the parameter coordinate system;
   wherein the image coordinate system uses any corner of the filtered remote sensing image as an origin, a horizontal direction of the filtered remote sensing image as an x-axis, and a vertical direction of the filtered remote sensing image as ay-axis; and
   the parameter coordinate system is expressed as $\rho = x \cos\theta + y \sin\theta$, wherein $\theta$ and $\rho$ represent polar coordinates of the edge points in the parameter coordinate system,
   wherein selecting the three optimal wavebands from N multi-spectral wavebands of the pre-processed remote sensing image comprises:
   selecting three wavebands corresponding to a maximum optimum index factor (OIF) from the multi-spectral wavebands of the pre-processed remote sensing image as the optimal wavebands;
   wherein the OIF is obtained based on Formula (1) as below:

$$\text{OIF} = S(i,j,k)/R(m,n) \qquad (1)$$

where in Formula (1), $$S(i,j,k) = S_i + S_j + S_k,$$

$R(m,n) = R_{mn}$,
$i, j, k \in \{1, \ldots, N\}$ and $i<j<k$,
$m, n \in \{i, j, k\}$ and $m<n$,
$S_i$, $S_j$, and $S_k$ each represent a standard deviation of an ith, jth, and kth waveband, respectively, $R_{mn}$ represents a correlation coefficient between the mth waveband and the nth waveband; and $$R_{mn} = \frac{\text{Cov}(m, n)}{\sqrt{D(m)} \sqrt{D(n)}},$$

wherein D(m) and D(n) respectively represent a variance of the mth waveband and a variance of the nth waveband, and wherein Cov(m,n) represents a covariance between the mth waveband and the nth waveband, and
   wherein performing sharpening processing on the remote sensing image combined by the optimal wavebands by using Gaussian high-pass filtering comprises:
   performing Gaussian high-pass filtering on the combined remote sensing image to obtain a filtered remote sensing image based on Formula (2) as below:

$$H(u, v) = 1 - e^{-\frac{D^2(u,v)}{2D_0^2}} \qquad (2)$$

where H(u,v) is the coefficient of the Gaussian high-pass filter at location (u,v) of a frequency rectangular that is the support of the Gaussian high-pass filter, D(u,v) represents a distance between a midpoint (u,v) of a frequency domain of the combined remote sensing image and the center of the frequency rectangle, and $D_0$ is a constant.

2. The method for extracting a geological linear body from a remote sensing image based on tensor voting coupled with Hough transformation according to claim 1, wherein pre-processing the remote sensing image comprises:
selecting any remote sensing image from a remote sensing image database as a current remote sensing image, the current remote sensing image containing a cloud amount of less than 5% and having rational polynomial coefficients (RPC) and statistical image grayscale information, the image grayscale information comprising a gray variance and a standard deviation for each waveband; and
performing radiometric calibration, atmospheric correction, and image cropping on the current remote sensing image.

3. The method for extracting a geological linear body from a remote sensing image based on tensor voting coupled with Hough transformation according to claim 1, wherein performing edge detection on the filtered remote sensing image to obtain edge points in the filtered remote sensing image comprises:
arbitrarily selecting a pixel from the filtered remote sensing image as a current pixel, and performing Laplacian convolution on the current pixel to obtain a tensor matrix T;
where $$T = \begin{bmatrix} \frac{\partial^2 I}{\partial x^2} & \frac{\partial^2 I}{\partial x \partial y} \\ \frac{\partial^2 I}{\partial y \partial x} & \frac{\partial^2 I}{\partial y^2} \end{bmatrix}, I$$

represents the filtered remote sensing image, and $$\frac{\partial^2 I}{\partial x^2}$$

and $$\frac{\partial^2 I}{\partial y^2}$$

respectively represent a second derivative of the filtered remote sensing image I along a direction x and a second derivative of the filtered remote sensing image I along a direction y, and $$\frac{\partial^2 I}{\partial x \partial y}$$

and $$\frac{\partial^2 I}{\partial y \partial x}$$

respectively are second derivatives of the filtered remote sensing image I along the x and y directions and along the y and x directions, wherein x and y respectively represent an x-axis and ay-axis of an image coordinate system established by taking any corner of the filtered remote sensing image I as an origin, a horizontal direction of the filtered remote sensing image I as the x-axis, and a vertical direction of the filtered remote sensing image I as the y-axis;
performing matrices spectrum decomposition on the tensor matrix T to obtain a rod-shaped component and a spherical component, where $$T = (\lambda_1 - \lambda_2)\vec{e_1}\vec{e_1}^T + \lambda_2(\vec{e_1}\vec{e_1}^T + \vec{e_2}\vec{e_2}^T), \vec{e_1}\vec{e_1}^T$$

represents the rod-shaped component, and $$(\vec{e_1}\vec{e_1}^T + \vec{e_2}\vec{e_2}^T)$$

represents the spherical component;
determining the current pixel as an edge point, if $(\lambda_1-\lambda_2) > \lambda_2$, otherwise, determining the current pixel as a non-edge point; and
repeating performing matrices spectrum decomposition and determining the current pixel as an edge point until all pixels of the filtered remote sensing image are determined as current pixels to obtain all the edge points in the filtered remote sensing image.

4. The method for extracting a geological linear body from a remote sensing image based on tensor voting coupled with Hough transformation according to claim 1, wherein converting all the obtained edge points in the filtered remote sensing image from the image coordinate system to the parameter coordinate system to extract the geological linear body from the parameter coordinate system comprises:
traversing the parameter coordinate system to search for a point with a local maximum value, determining the point with the local maximum value as a peak point, and setting coordinates of the peak point as $(\rho, \theta)$, wherein $(\rho, \theta)$ respectively represent a slope and an intercept of the geological linear body in the filtered remote sensing image; and
converting the coordinates corresponding to the peak point in the parameter coordinate system into the image coordinate system, and connecting the edge points according to a direction of each edge point and a distance of an end point to obtain an image of the geological linear body, thereby completing the extraction of the geological linear body.

* * * * *